US012444880B2

(12) United States Patent
Goel et al.

(10) Patent No.: US 12,444,880 B2
(45) Date of Patent: Oct. 14, 2025

(54) MAGNETIC POWER DISTRIBUTION ASSEMBLY

(71) Applicants: Chirag Goel, Deerfield, IL (US); Kevin Adrian Fitzmorris, Mandeville, LA (US); Emma Garrity Ruck, Laguna Beach, CA (US); Valeria Julieta Vita, Evanston, IL (US)

(72) Inventors: Chirag Goel, Deerfield, IL (US); Kevin Adrian Fitzmorris, Mandeville, LA (US); Emma Garrity Ruck, Laguna Beach, CA (US); Valeria Julieta Vita, Evanston, IL (US)

(73) Assignee: Tego Innovations, Inc., Deerfield, IL (US)

( * ) Notice: Subject to any disclaimer, the term of this patent is extended or adjusted under 35 U.S.C. 154(b) by 347 days.

(21) Appl. No.: 18/143,999

(22) Filed: May 5, 2023

(65) Prior Publication Data

US 2023/0361504 A1 Nov. 9, 2023

Related U.S. Application Data

(60) Provisional application No. 63/338,617, filed on May 5, 2022.

(51) Int. Cl.
*H01R 13/62* (2006.01)
*H01R 13/453* (2006.01)
(Continued)

(52) U.S. Cl.
CPC ..... *H01R 13/6205* (2013.01); *H01R 13/4532* (2013.01); *H01R 31/06* (2013.01); *H01R 33/88* (2013.01)

(58) Field of Classification Search
CPC ...................... H01R 13/6205; H01R 13/4532; H01R 31/06; H01R 33/88
See application file for complete search history.

(56) References Cited

U.S. PATENT DOCUMENTS 3,363,214 A * 1/1968 Wright ............... H01R 13/6205 439/39
3,521,216 A * 7/1970 Jerair ................. H01R 13/6205 439/675

(Continued)

OTHER PUBLICATIONS

International Search Report and Written Opinion issued to PCT/US23/21214 dated Jul. 18, 2023, 5 pages.

*Primary Examiner* — Thanh Tam T Le
(74) *Attorney, Agent, or Firm* — UIC School of Law Patent Clinic

(57) ABSTRACT

A magnetic charging assembly includes an insert and an adapter including opposing front and back surfaces. Pins extend from the back surface of the adapter, and the front surface includes an outlet configured to receive a plug. A first set of magnets is provided adjacent to the back surface. The insert includes a front surface, a plurality of pin receiving cavities extending inwardly from the front surface, and a second set of magnets is provided adjacent to an inner side of the front surface. The first set of magnets and the second set of magnets enable the adapter to attach to the insert. The set of pins and the pin receiving cavities are electrically conductive such that, when the pins of the adapter are received by the pin receiving cavities of the insert, power is provided through the outlet of the adapter.

15 Claims, 13 Drawing Sheets

(51) Int. Cl.
*H01R 31/06* (2006.01)
*H01R 33/88* (2006.01)

(56) References Cited

U.S. PATENT DOCUMENTS

| | | | | | |
|---|---|---|---|---|---|
| 4,494,809 | A * | 1/1985 | Soloman | H01R 31/06 | 439/651 |
| 4,579,410 | A * | 4/1986 | Soloman | H01R 13/6397 | 439/651 |
| 7,329,128 | B1 * | 2/2008 | Awad | H01R 13/6205 | 439/38 |
| 7,726,973 | B1 * | 6/2010 | Perry | H01R 13/6205 | 439/39 |
| 7,946,890 | B1 * | 5/2011 | Bondo | H01R 31/065 | 439/638 |
| 8,668,516 | B2 * | 3/2014 | Lee | H01R 13/6691 | 439/652 |
| 9,660,378 | B2 * | 5/2017 | Silvers | H01R 13/516 | |
| 10,096,938 | B2 * | 10/2018 | McClelland | H01R 13/629 | |
| 10,135,179 | B2 * | 11/2018 | Cooper | A47J 27/2105 | |
| 11,411,345 | B2 * | 8/2022 | Holway | H01R 33/205 | |
| 11,811,174 | B2 * | 11/2023 | Amini | H01R 24/38 | |
| 2012/0071008 | A1 * | 3/2012 | Sessford | H01R 13/6205 | 439/39 |
| 2015/0031638 | A1 | 1/2015 | Ekre et al. | | |
| 2015/0077064 | A1 | 3/2015 | Buelow | | |
| 2020/0203895 | A1 * | 6/2020 | Veidung | H02J 50/10 | |

* cited by examiner

MAGNETIC POWER DISTRIBUTION ASSEMBLY

CROSS-REFERENCE TO RELATED APPLICATIONS

This application claims the benefit of priority to U.S. Provisional Application No. 63/338,617 filed May 5, 2022, which is hereby incorporated by reference.

BACKGROUND

The present subject matter relates generally to the charging and powering of devices by type A and type B plugs through an electrical outlet. More specifically, the subject matter relates to a charging adapter that utilizes a magnetic connection and internal spring-loaded cover plate system to safely transmit power both electrically and physically.

The conventional Type B plug designed for use with the conventional Type B wall outlet has been the standard for power transmission in the United States for decades. With the development of new technologies, wall outlets have become an integral component in powering devices. Adapters, extension cords, and power strips harness the power from wall outlets, but still require their use.

Though these wall outlets are essential to the usage of electronic devices, their design can create difficulties or safety risks for users. Devices are typically connected to the conventional outlet through a cord, presenting a risk of tripping over cords since the plug connected to the end of the cord is firmly tethered to the wall once plugged into the outlet. The dexterity and mobility needed to plug a device in also creates a challenge for those with reduced functionality in their hands. All of these examples present issues especially to those with physical disabilities and/or mobile limitations.

A more significant risk is that conventional wall outlets allow for exposed live voltage and/or current through their holes. Children with small fingers or someone sticking a foreign object into the holes can easily injure and/or electrocute themselves.

Recently, technologies have been created to address these problems. In some modern wall outlets, coverings over the outlet holes are integrated into the assembly to stop the outlet holes from being exposed unless plugged in. These covers achieve their goal, but require a strong hand to insert a plug into the outlet. Other companies have engineered magnetic charging pads and plugs to power their devices, but these technologies are tailored to the specific device, such as a smart phone or watch, and do not address general wall outlets, rendering them incompatible across different types of devices.

Therefore, a need exists in the field of power transmission capable of powering devices with greater ease of use while protecting users from both electric shock and trip hazards. A further need exists for the technology to be used universally, rather than only for specific products and connections.

SUMMARY

The present invention comprises a novel power distribution device generally consisting of two adapters and an insert, which is capable of disconnecting given ample force due to its magnetic connection. An internal spring-loaded cover plate system is embedded within the device to protect from runaway voltage and/or current when not in use.

DETAILED DESCRIPTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted or idealized or overly formal unless expressly so defined herein.

In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Referring to FIGS. 1-14, novel magnetically connected powering devices, apparatuses, and methods for powering electronic devices are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1:
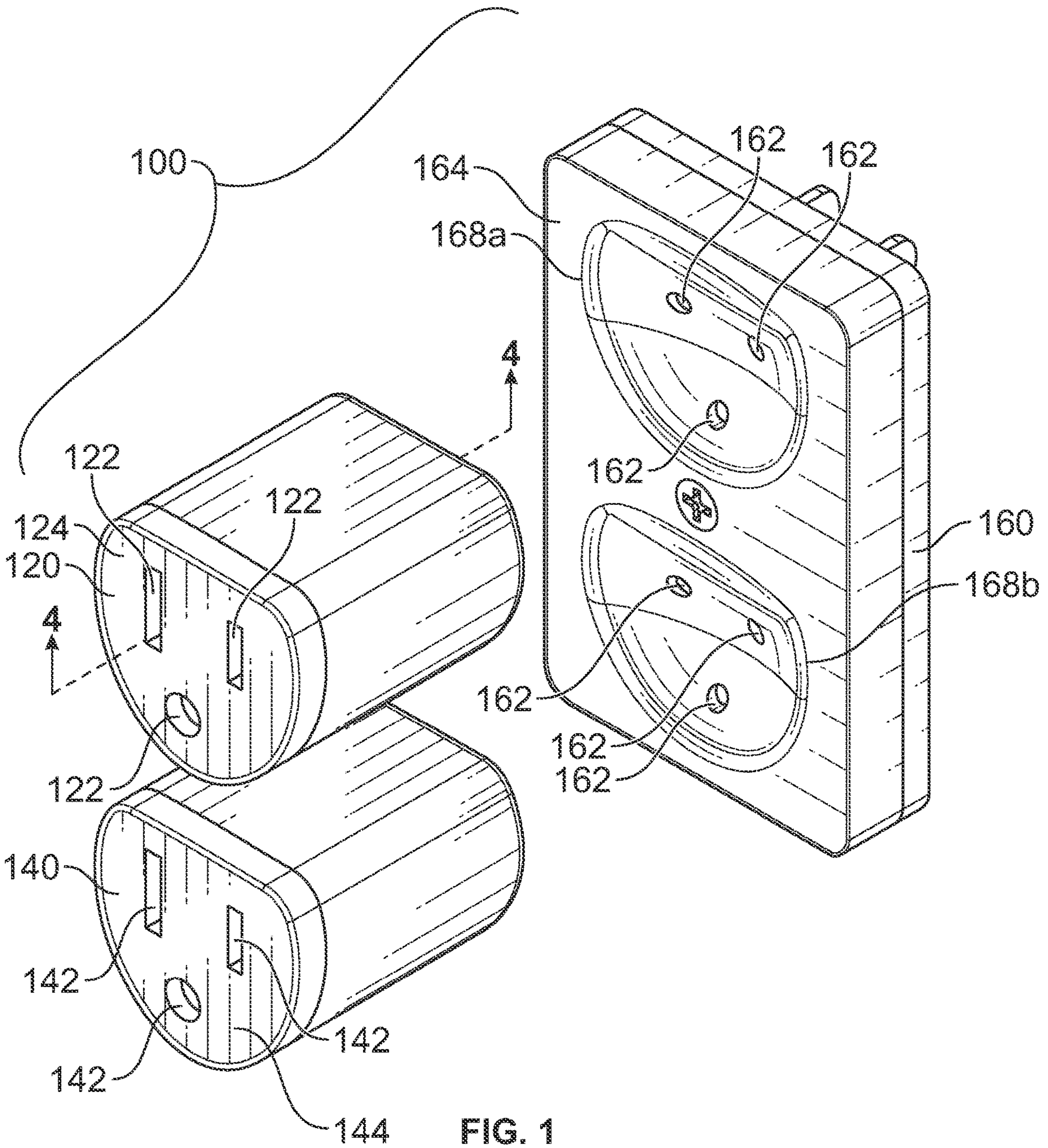
FIG. 1 illustrates a perspective, exploded view from the front of an example of a magnetic charging assembly according to various embodiments of the present invention.
Figure 2:
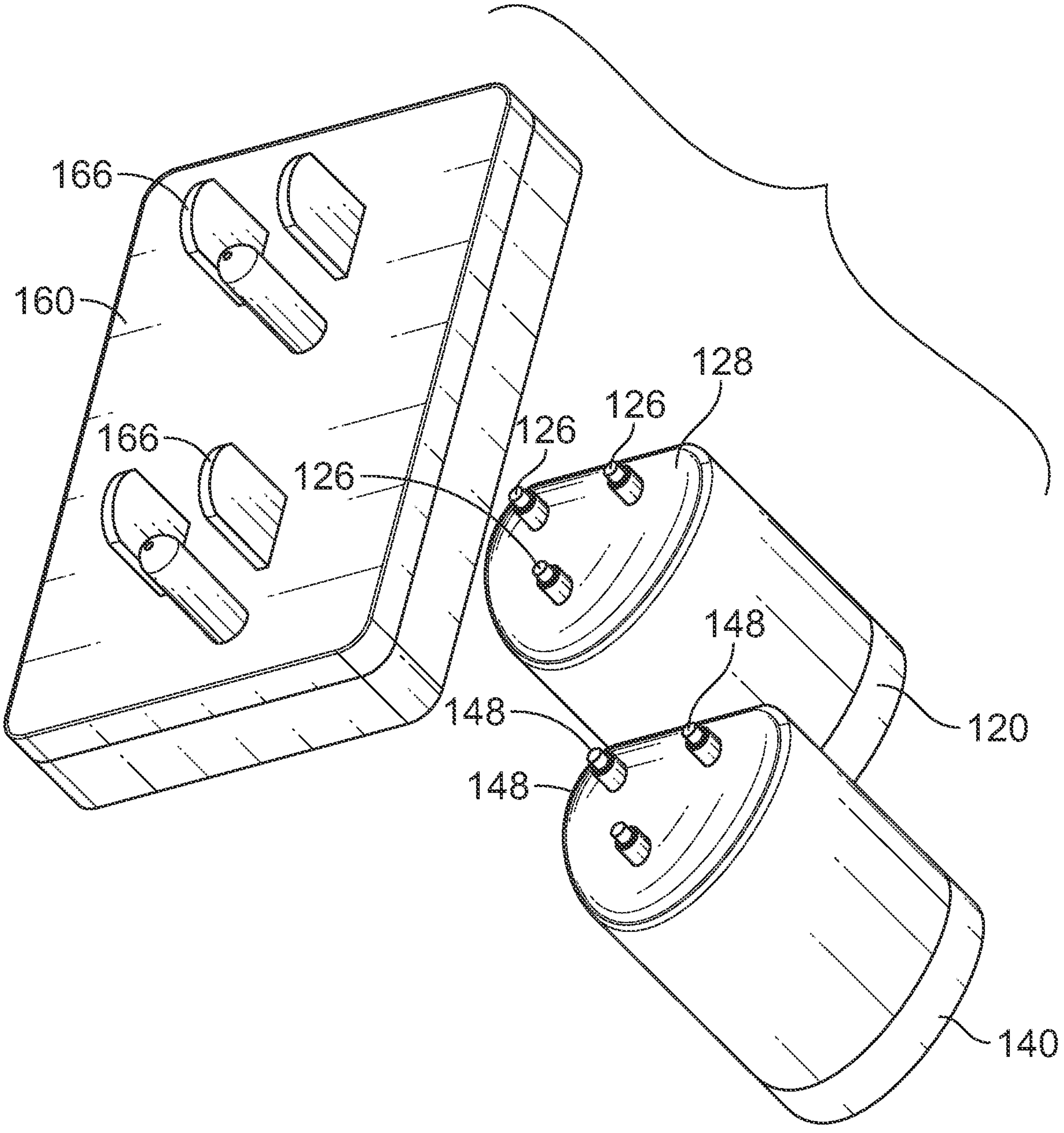
FIG. 2 illustrates a perspective, exploded view from the back of the magnetic charging assembly of FIG. 1.

As shown in FIGS. 1 and 2, an example magnetic charging assembly 100 includes an insert 160 and first and second adapters 120, 140. The insert 160 includes a plurality of pin receiving cavities 162 on a front, outer surface 164 for receiving a plug of a device. During use, the pin receiving cavities 162 of the insert 160 receive an adapter 120, 140 is configured to connect thereto. Each adapter 120, 140 includes type A or B openings 122, 142 on a front, outer surface 124, 144 thereof as well as electrically conductive pins 126, 146 on a back surface 128, 148 thereof. The type A or B openings 122, 142 on the front of the adapter 120, 140 allow for insertion of plugs of devices to be powered and a place for the current to flow. The pins 126, 146 on the back surface allow for mating with the pin receiving cavities 162 of the insert 160. The insert 160 is connected to voltage sources, such as the wall socket. In the embodiment illustrated in FIG. 2, the insert 160 includes plugs 166 for inserting into a wall socket. In the illustrated embodiment, the insert 160 is configured to receive two adapters 120, 140. In other embodiments, the insert 160 may be designed to receive one adapter or more than two adapters.

Figure 3:
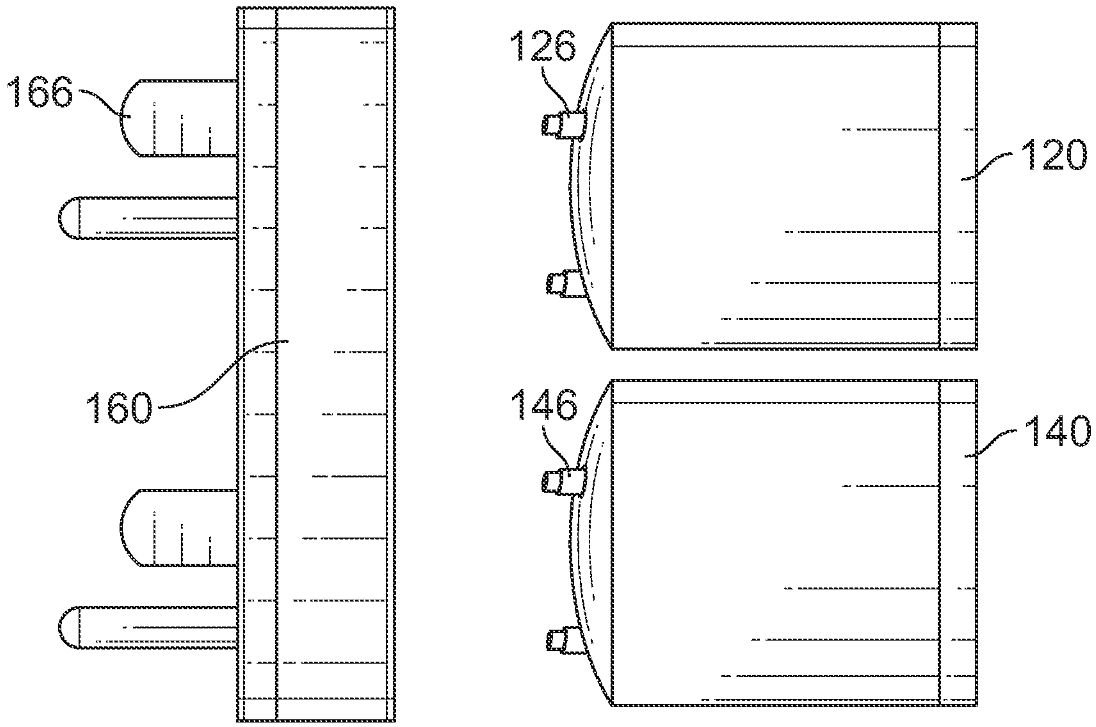
FIG. 3 illustrates a side elevational, exploded view of the magnetic charging assembly of FIG. 1.

FIG. 3 shows example widths of one embodiment of the insert 160 and adapters 120, 140. The illustrated proportions of the components are exemplary only and may be modified as needed.

As shown in FIGS. 1-3, the back surface 128, 148 of each adapter 120, 140 and the corresponding portion **168*a*, 168*b* of the front surface 164 of the insert 160 have mating curved surfaces that facilitate the connection of the adapter 120, 140 to the insert 160 in the correct orientation. The insert 160 has a concave section while the adapters 120, 140 have a convex section that fits into the respective portions 168*a*, 168*b* of the insert 160**. The curves are designed specifically to only allow one orientation for connection. In one embodiment, the curves' bases have a non-symmetrical geometry so that they can only be fitted in the correct y-axis orientation.

Additionally, the intensity of the curve's height has been tested to allow for maximum stability in both the x and y directions without excessive height or inhibiting the disconnection of the two parts when an appropriate force is applied. In combination with the magnets described below, the curves allow for the connection of the insert 160 and the adapter 120, 140 to be as stable as possible.

Referring to FIGS. 1 and 2, the back surface 128, 148 of each adapter 120, 140 includes three pins 126, 146 that mate with corresponding pin receiving cavities 162 in the front surface 164 of the insert 160 within the corresponding curved portions **168*a*, 168*b*. The pins 126, 146 bridge the energy connection between the adapter and the insert. The positioning of the pins 126, 146 corresponds to the positioning of type B prongs. The pins 126, 146 may be any conductive element that allows for a solid connection. When the insert 160 and the adapters 120, 140 are mated, the pins 126, 146 align to allow the two electrical circuits to connect, and the current from some source to flow through both the insert 160 and the adapters 120, 140** to the devices needing power.

The elements of the magnetic charging assembly 100 are configured to combine into one succinct product that covers both sockets on an US plug type B wall outlet. This is to protect from any opportunity to receive live voltage and/or current from the outlet itself. The adapters 120, 140 are designed to detach easily from the insert 160 when a sufficient pulling force is applied without grabbing onto any of the components of the insert 160. Additionally, it is important to note that the adapter 120, 140 should not be placed on the insert 160 without the desired device to be powered plugged into it. An exposed adapter 120, 140 would leave an unprotected outlet and ultimately withhold the device from offering the same safety measures.

Figure 4A:
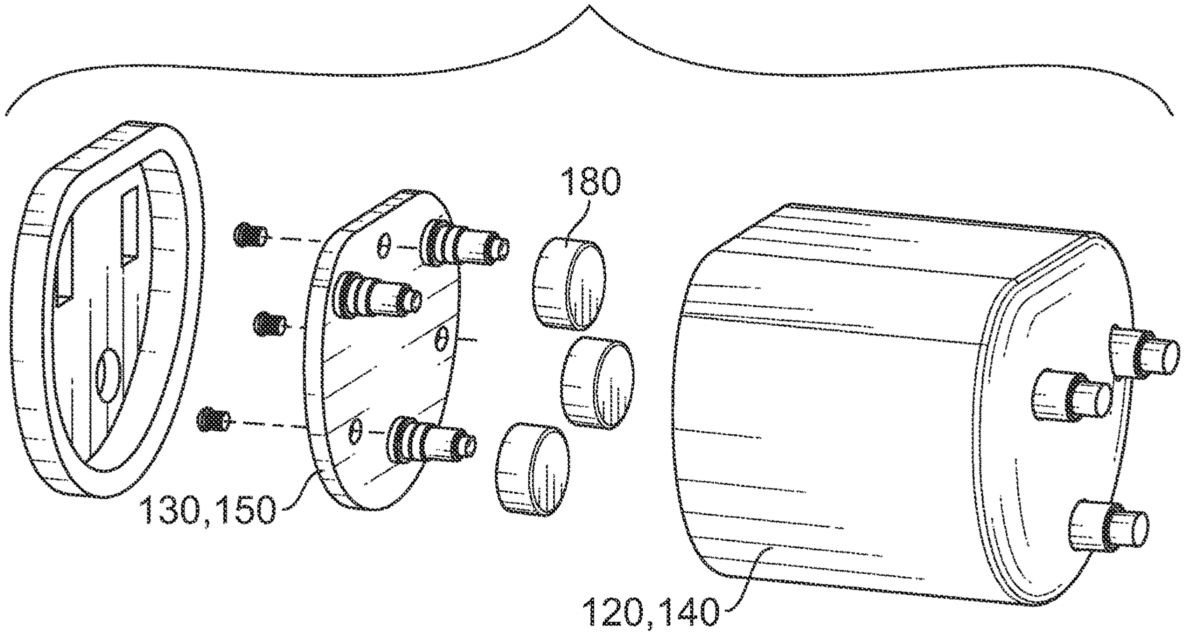
FIG. 4A illustrates a perspective, exploded view of an adapter of the magnetic charging assembly of FIG. 1.
Figure 4B:
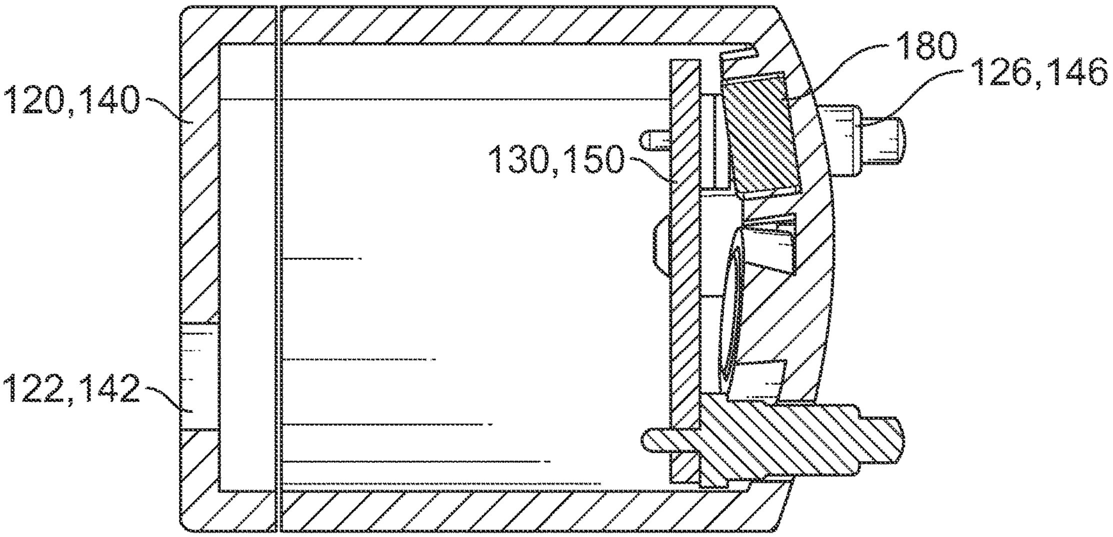
FIG. 4B illustrates a cross-sectional view of the adapter of FIG. 4A generally taken along lines 4-4 of FIG. 1.
Figure 5:
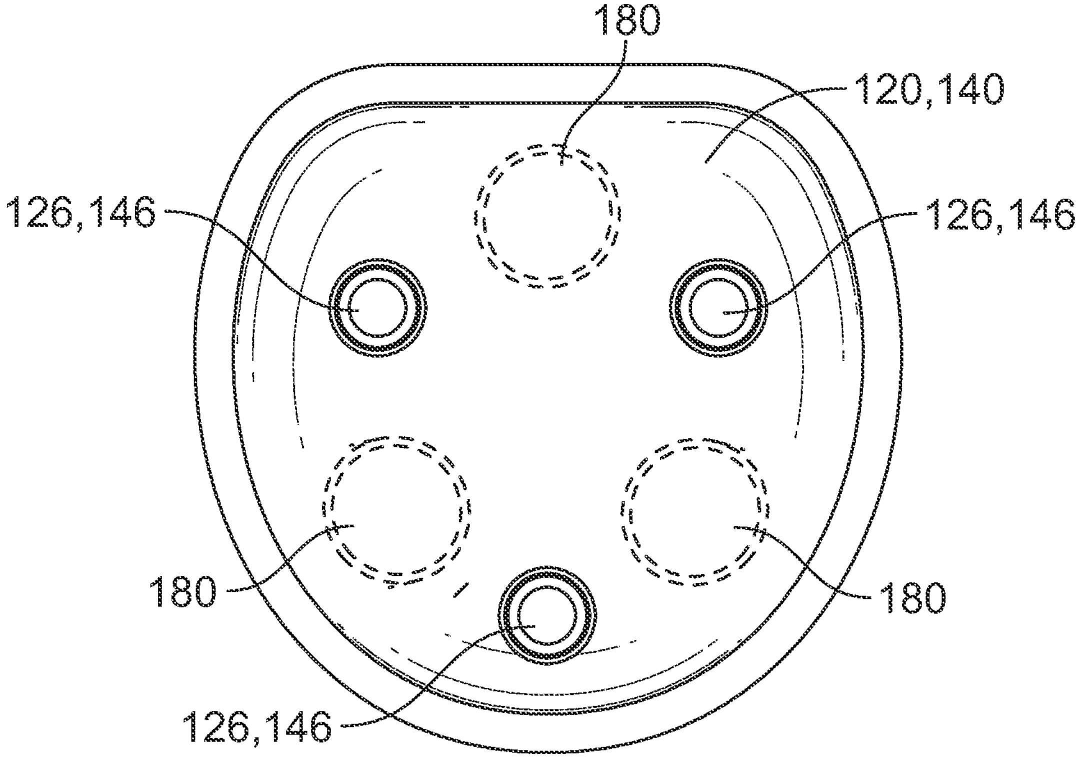
FIG. 5 illustrates a back elevational view of the adapter of FIG. 4A.

In the illustrated embodiment, the adapters 120, 140 are secured in place onto the insert 160 through the use of magnets 180, 200. In each adapter 120, 140, a first set of magnets 180 are mounted against the back surface of the adapter 120, 140 within an inner volume thereof as shown in FIGS. 4A, 4B, and 5. Within the adapter 120, 140, the pins 126, 146 are mounted onto a circuit board 130, 150 that contacts the plug of the respective device once plugged into the adapter.

Referring to FIGS. 6A-7B, a corresponding set of magnets 200 are mounted against the front surface of the insert 160 within an inner volume thereof. During use, the first set of magnets 180 in the adapter 120, 140 are attracted to the second set of magnets 200 within the insert 160. The magnets 180, 200 create a stable hold while still allowing for the connection to be easily broken given a sufficient amount of force.

Figure 6C:
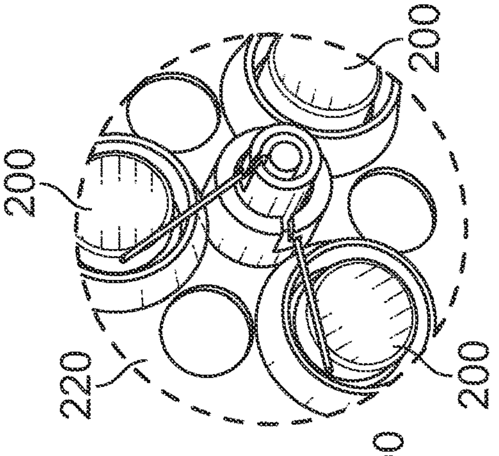
FIGS. 6A, 6B, and 6C illustrate front, back, and enlarged perspective views of an internal spring-loaded cover plate provided within the insert of the magnetic charging assembly of FIG. 1.
Figure 6B:
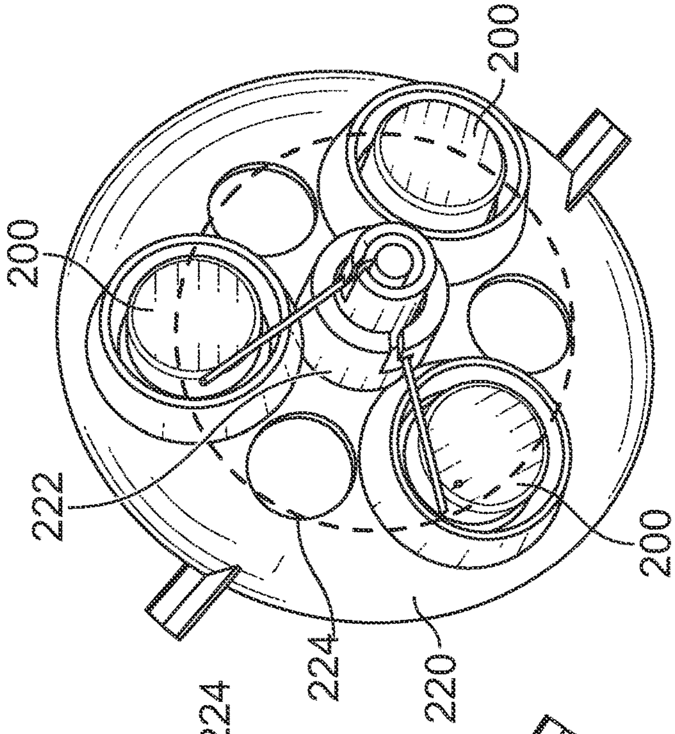
Figure 6A:
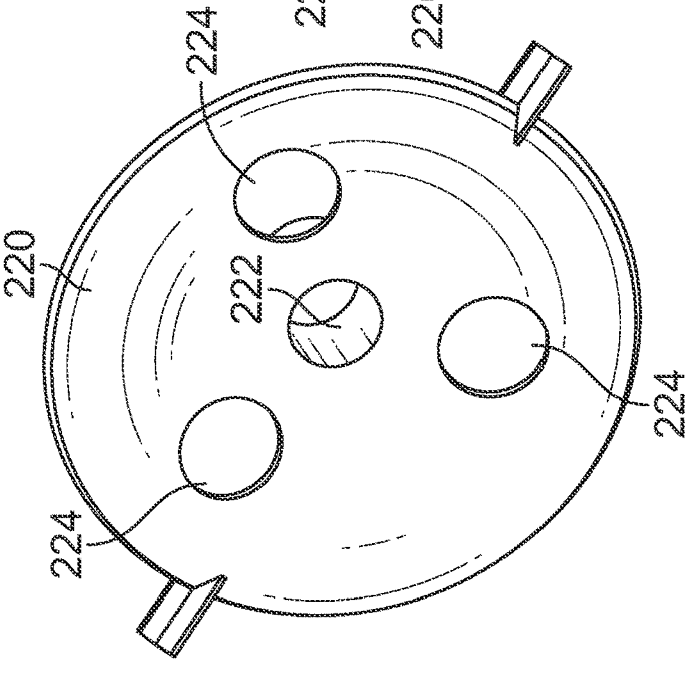
Figure 7A:
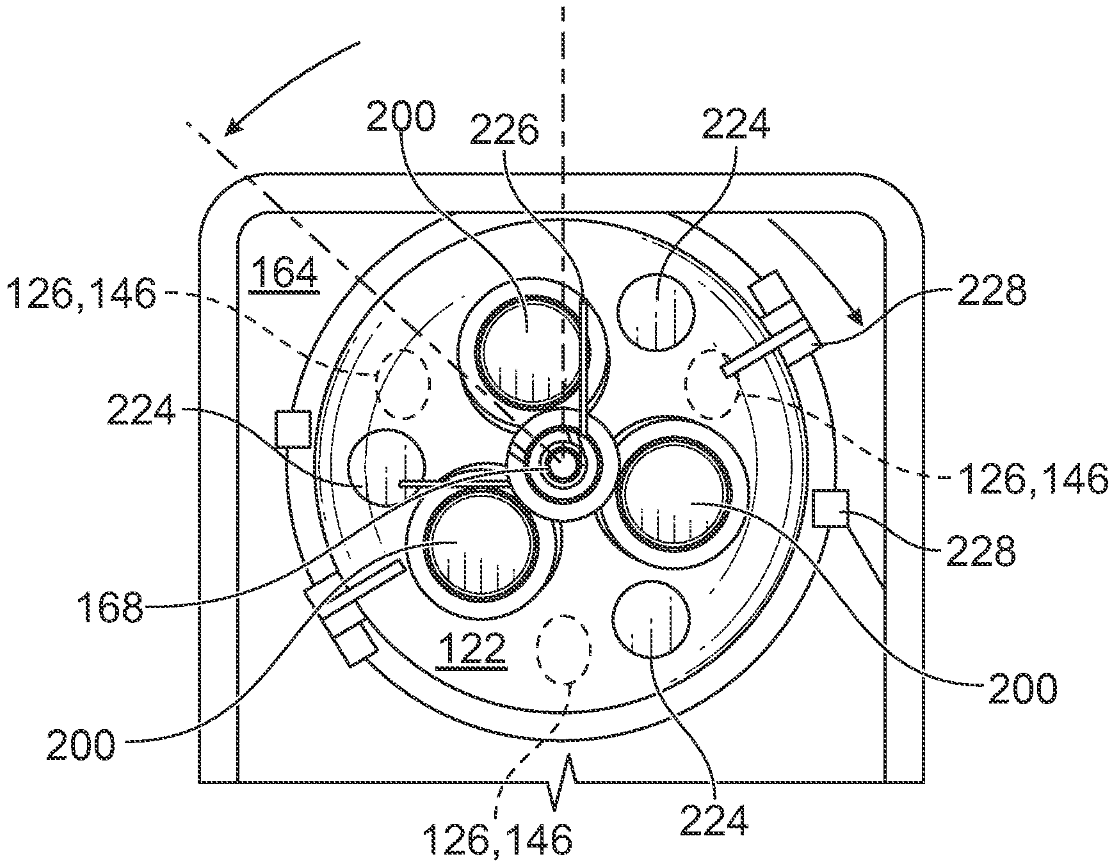
FIGS. 7A and 7B illustrate back elevational views of the insert showing the internal spring-loaded cover plate of FIGS. 6A and 6B in a disconnected position and a connected position, respectively.
Figure 7B:
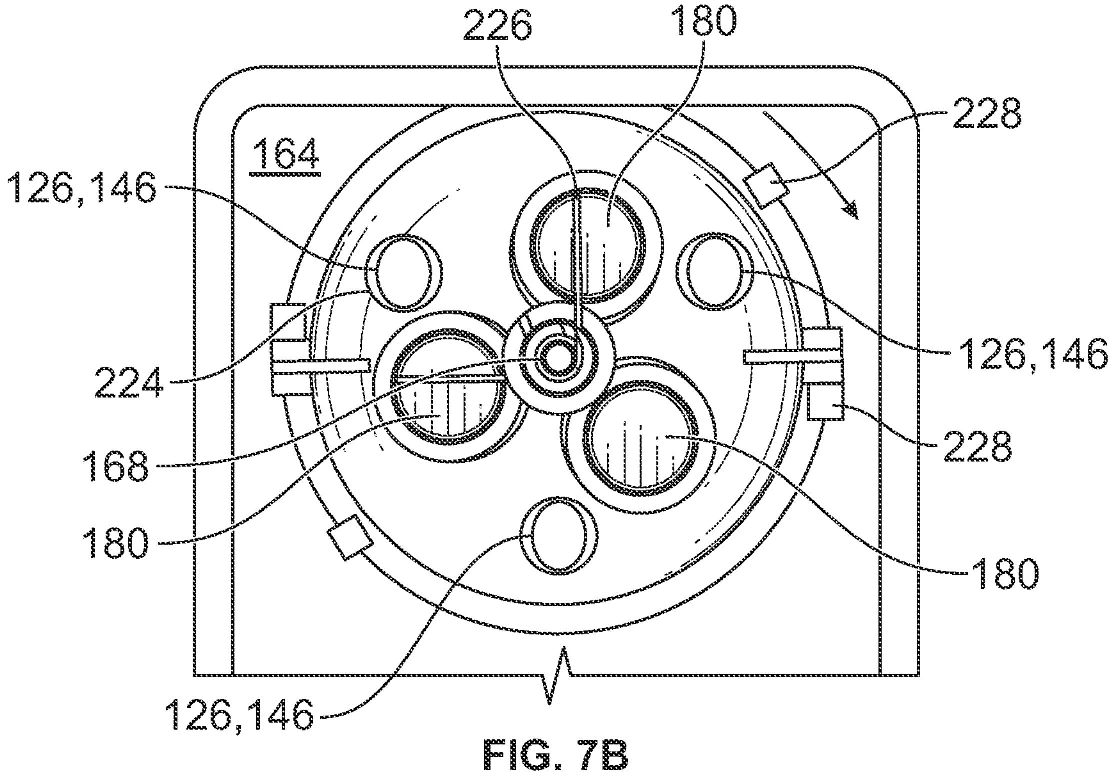
Figure 8:
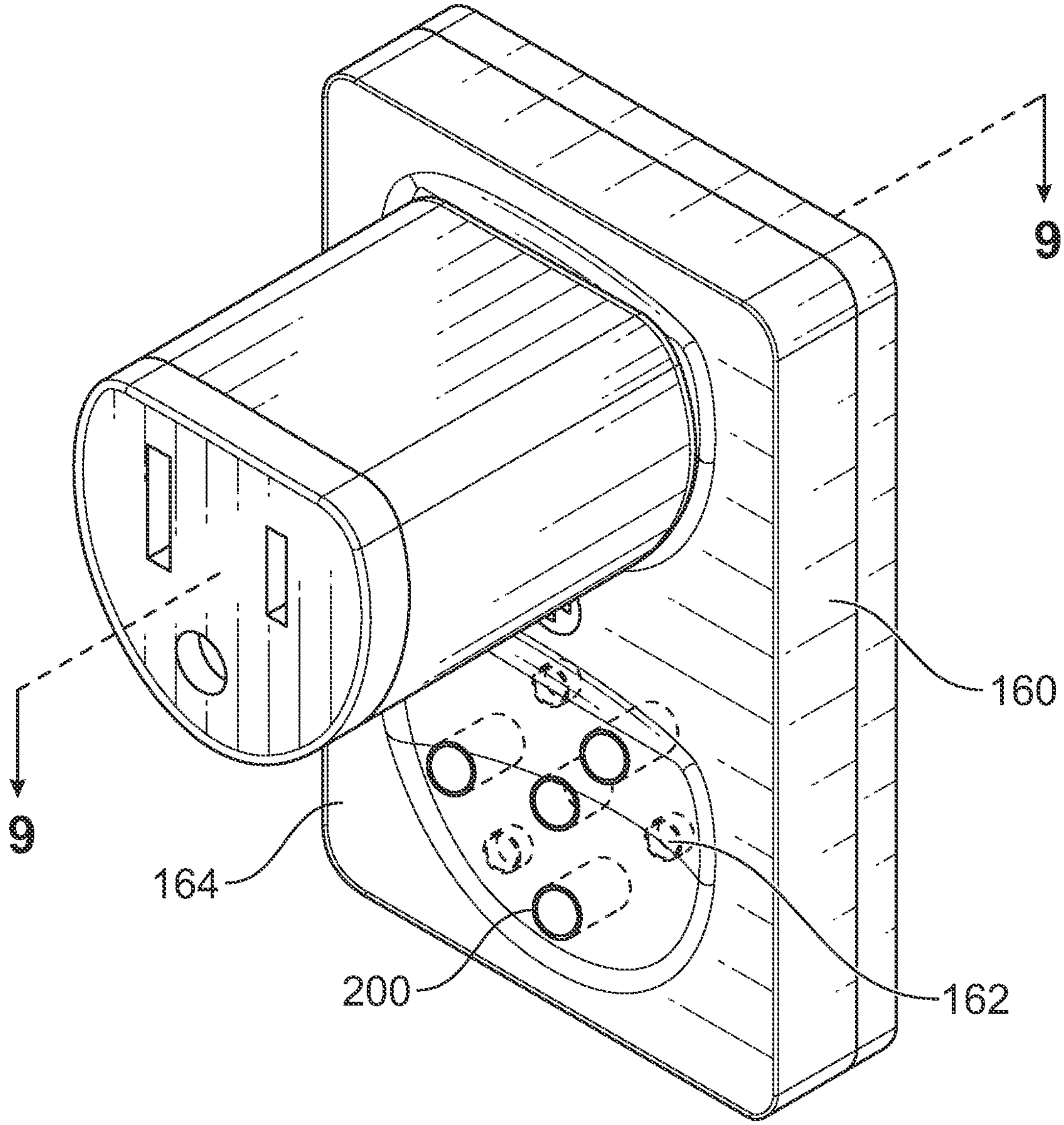
FIG. 8 illustrates a perspective view of the insert of the magnetic charging assembly of FIG. 1 showing the positioning of the internal spring-loaded cover plate in the connected position.
Figure 9:
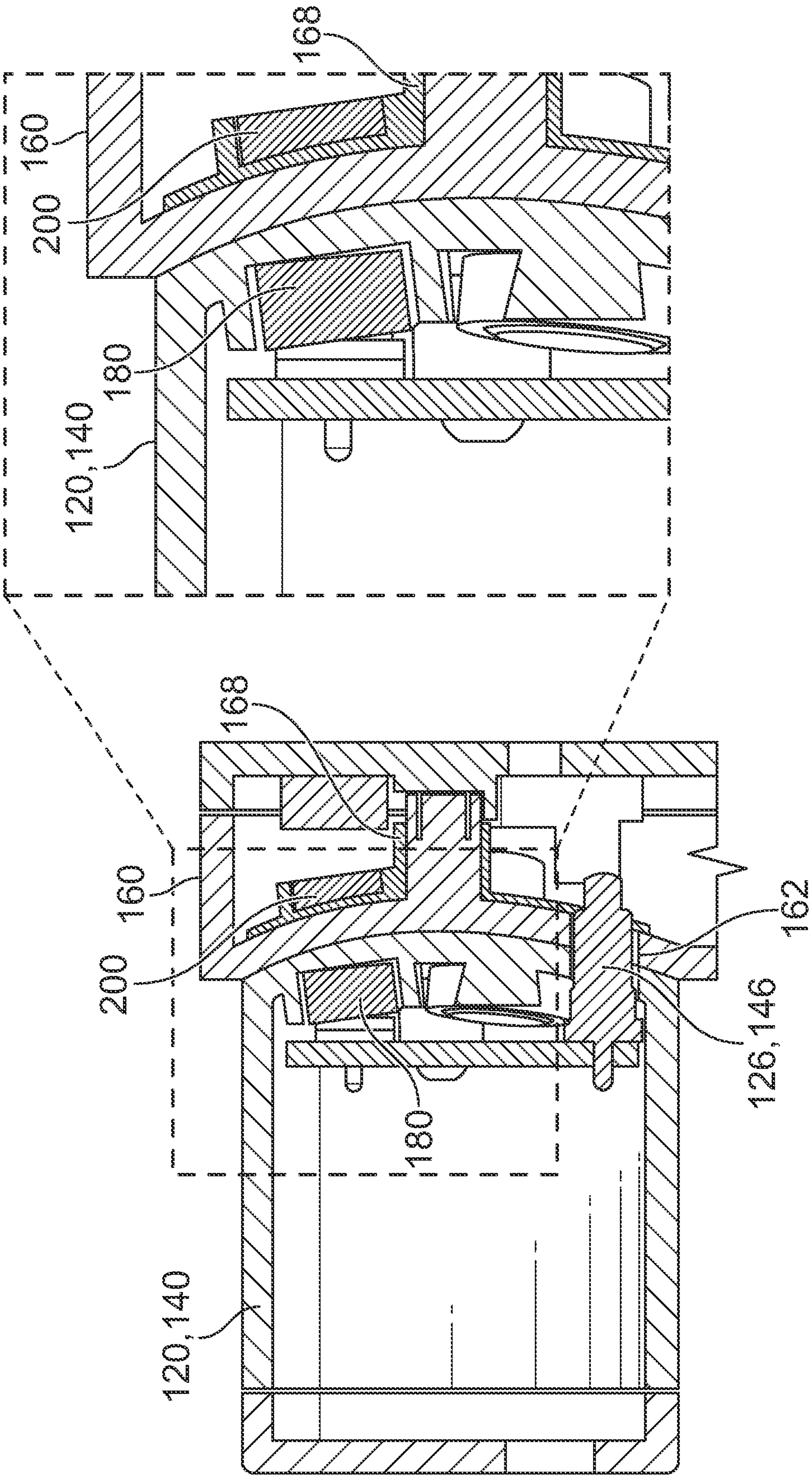
FIG. 9 illustrates a cross-sectional view of the magnetic charging assembly generally taken along the lines 9-9 of FIG. 8 showing the internal barrier in the connected position.

Within the insert 160, the second set of magnets 200 is mounted onto an internal spring-loaded cover plate 220 that moves between a disconnected position (FIG. 7A) and a connected position (FIG. 7B). Referring to FIGS. 6A and 6B, the internal spring-loaded cover plate 220 has curved shape that corresponds to and mates with the curvature of the front surface 164 of the insert 160. The internal spring-loaded cover plate 220 includes a central cylindrical portion 222 that receives a protruding member 168 extending inwardly from the front surface of the insert 160 (see FIGS. 6C, 7A, and 7B) such that the spring-loaded cover plate 220 can rotate about the protruding member 168 between the disconnected and connected positions.

The second set of magnets 200 of the insert 160 is mounted to the internal spring-loaded cover plate 220, and a plurality of openings 224 of the plate 220 is provided and configured to allow the pins 126, 146 of the adapter 120, 140 to pass therethrough and into the pin receiving cavities 162 of the insert 160 when the adapter 120, 140 is connected to the insert 160. When the internal spring-loaded cover plate 220 is in the connected position, the first and second sets of magnets 180, 200 are engaged and attracted to one another and the plurality of openings 224 is aligned with the corresponding pins 126, 146 of the adjacent adapter 120, 140 and the pin receiving cavities 162 of the insert 160.

A spring mechanism 226 connects the internal spring-loaded cover plate 220 to the protruding member 168 of the insert 160 and biases the internal spring-loaded cover plate 220 into the disconnected position. In the disconnected position, the plurality of openings 224 of the plate 220 is not aligned with the corresponding pins 126, 146 of the adjacent adapter 120, 140 and/or the pin receiving cavities 162 of the insert 160 such that the plate 220 blocks anything from entering the pin receiving cavities 162. The barrier mechanism 220 therefore blocks objects, such as small fingers and metallic materials such as paper clips and eating utensils, and other items, from being inserted into the electrically-conductive pin receiving cavities. In some embodiments, the spring mechanism is a torsion spring, although any suitable biasing component may be used.

During use, the first and second sets of magnets enable the internal spring-loaded cover plate 220 to rotate and allow the adapter 120, 140 to be plugged into the insert 160. When the internal spring-loaded cover plate 220 is in the disconnected position, the second set of magnets 200 attached to the internal spring-loaded cover plate 220 in insert 160 is offset from the positioning needed to engage the first set of magnets 180 on adapter 120, 140 during use. When the adapter 120, 140 is brought near the insert 160, the first set of magnets 180 in the adapter 120, 140 causes the plate 220 to rotate against the bias of the spring mechanism 226 to bring the second set of magnets 200 toward and aligned with the first set of magnets 180. This movement causes the plurality of openings 224 in the internal spring-loaded cover plate 200 to align with the pin receiving cavities 162 of the insert 160, allowing the pins 126, 146 of the adapter 120, 140 to pass through the spring-loaded cover plate 220 and into the pin receiving cavities 162. The cover plate 222 also includes stop features 228 to limit rotation of the cover plate 222 about the protruding member 168 of the insert 160 between and not beyond the disconnected and connected positions.

The internal barrier mechanism 220 is embedded into the device to protect from live voltage and/or current when the adapter 120, 140 is not connected by covering the live pin receiving cavities 162. In another embodiment shown in FIGS. 10 and 11, a simple spring loaded barrier system positions a cover 300 over the pin receiving cavity 162 while the adapter 120, 140 is disengaged.

Figure 10:
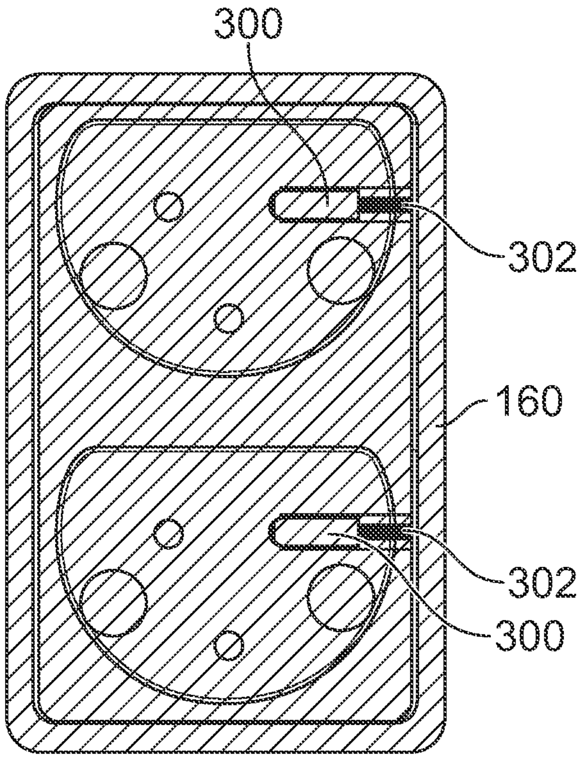
FIGS. 10 and 11 illustrate elevational views of an alternative embodiment of the magnetic charging assembly of the present application including a spring loaded barrier system.

As shown in FIG. 10, the cover 300 is biased into place by a spring mechanism 302 and moves laterally toward a side surface of the insert 160 as the adapter 120, 140 moves into place, with the pin 126, 146 pushing the cover 300 to the side. In this embodiment, the spring loaded barrier system covers 300 only the pin receiving cavity 162 that carries the live voltage and/or current, as the other two pin receiving cavities 162 do not carry live voltage and/or current and are therefore not a safety concern.

Figure 11:
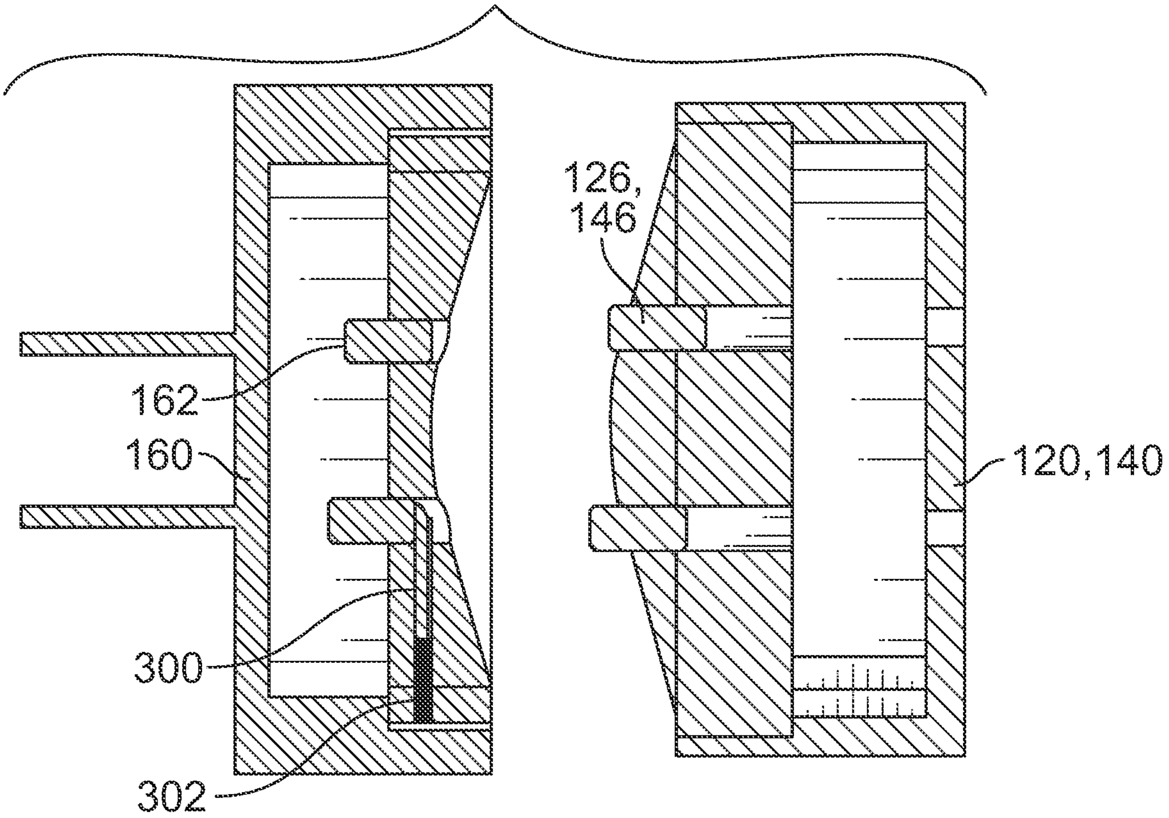

The cover 300 is designed to ensure that only the pins 126, 146 can push the barrier or cover to the side and that other objects that commonly fit into electrical sockets cannot do so. Specifically, as shown in FIG. 11, the cover 300 has a slanted geometry that allows the pins 126, 146 of the adapter 120, 140 to release the cover while sharp objects, such as a fork, cannot gain enough leverage to do so. Larger objects, such as a finger, that are not specifically designed for the space are unable to gain enough force within the small area to push the cover back. The cover's edges, when deployed, are hidden within the housing of the insert 160 and cannot be used to grip and push the latch back as well. All these features have been tested to ensure the overall safety of the device.

Referring to the embodiment shown in FIGS. 6A and 6B, the openings 224 of the spring-loaded cover plate 222 configured to receive the pins 126, 146 also includes a slanted geometry to allow the pins 126, 146 of the adapter 120, 140 to cause the plate 222 to rotate and allow the pins 126, 146 to enter the pin receiving cavities 162 of the insert 160.

Referring to the embodiment illustrated in FIG. 1, a screw is provided within the insert 160 to secure the insert 160 onto a standard wall outlet. The screw is an optional addition to the magnetic charging device assembly 100, making it virtually impossible to remove the insert 160 without unscrewing it. Thus, screwing the insert 160 on a wall outlet is not necessary for the functionality of the device but exists should a user want to ensure near-permanent security of insert 160 onto the wall outlet.

Figure 12:
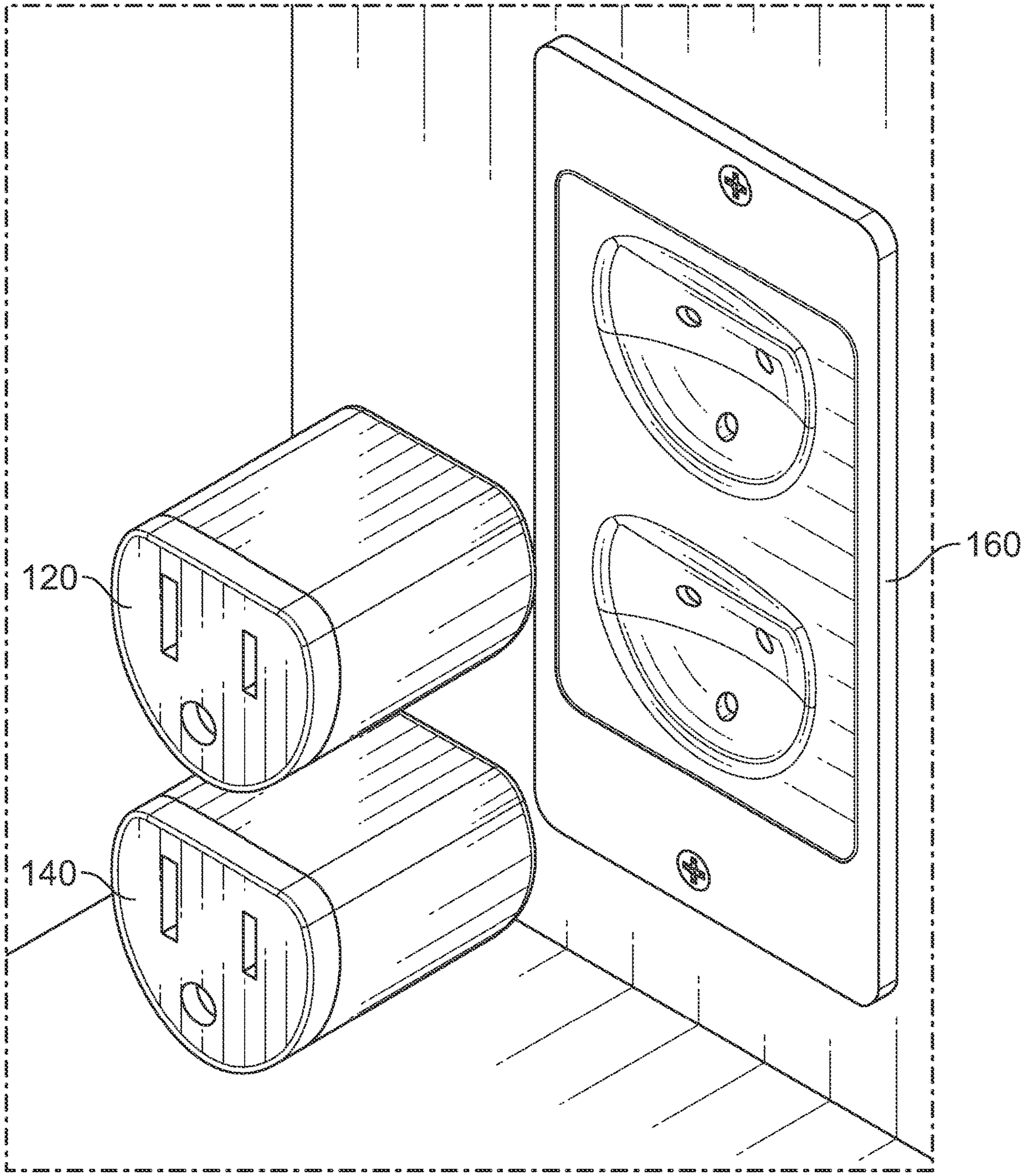
FIG. 12 illustrates a perspective view of an embodiment of an alternate magnetic charging assembly embedded within a wall, replacing the standard wall outlet.
Figure 13:
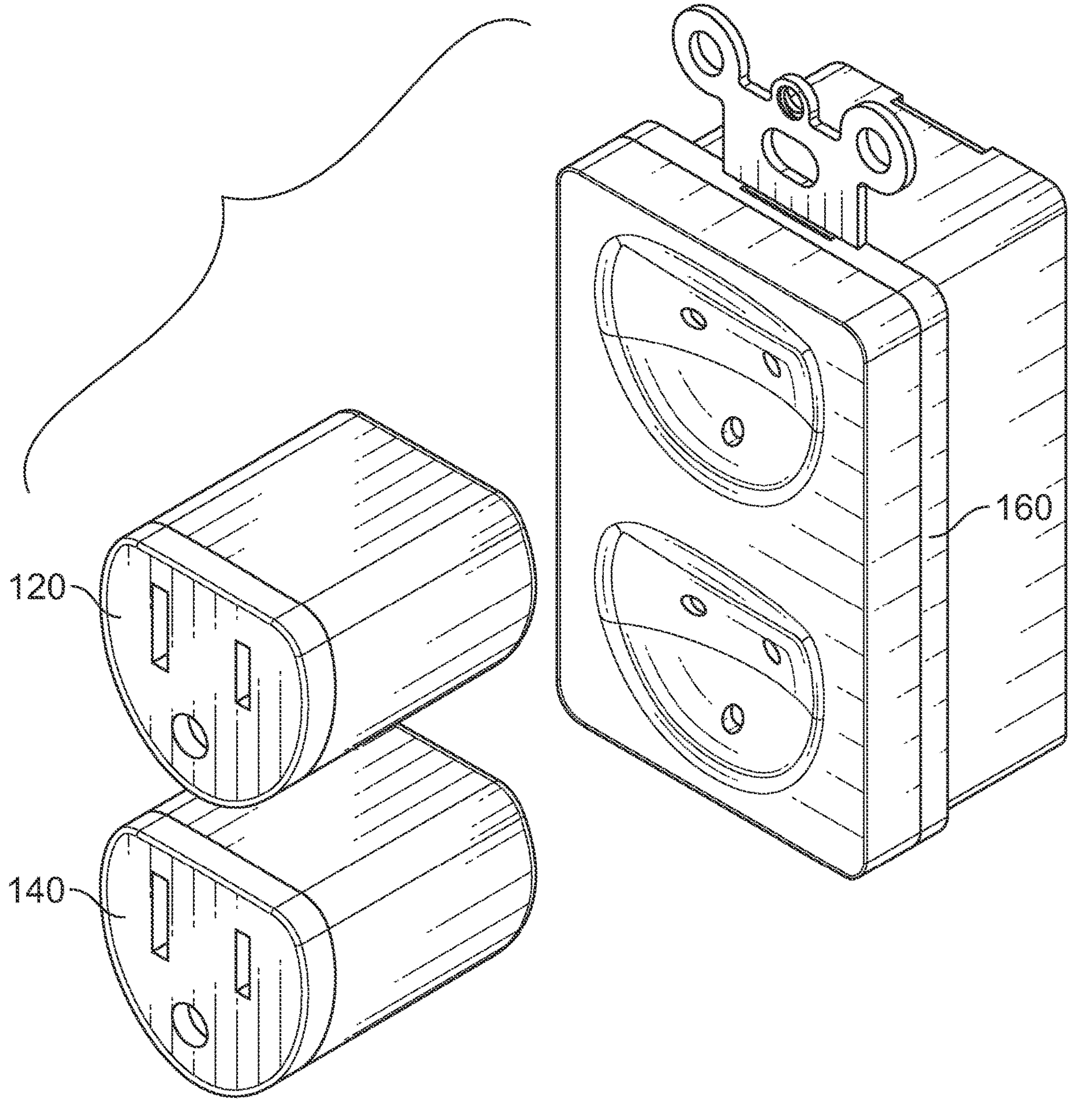
FIG. 13 illustrates a perspective view of an embodiment of an alternate magnetic charging assembly prior to being embedded into a wall, replacing the standard wall outlet, as shown in FIG. 12.
Figure 14:
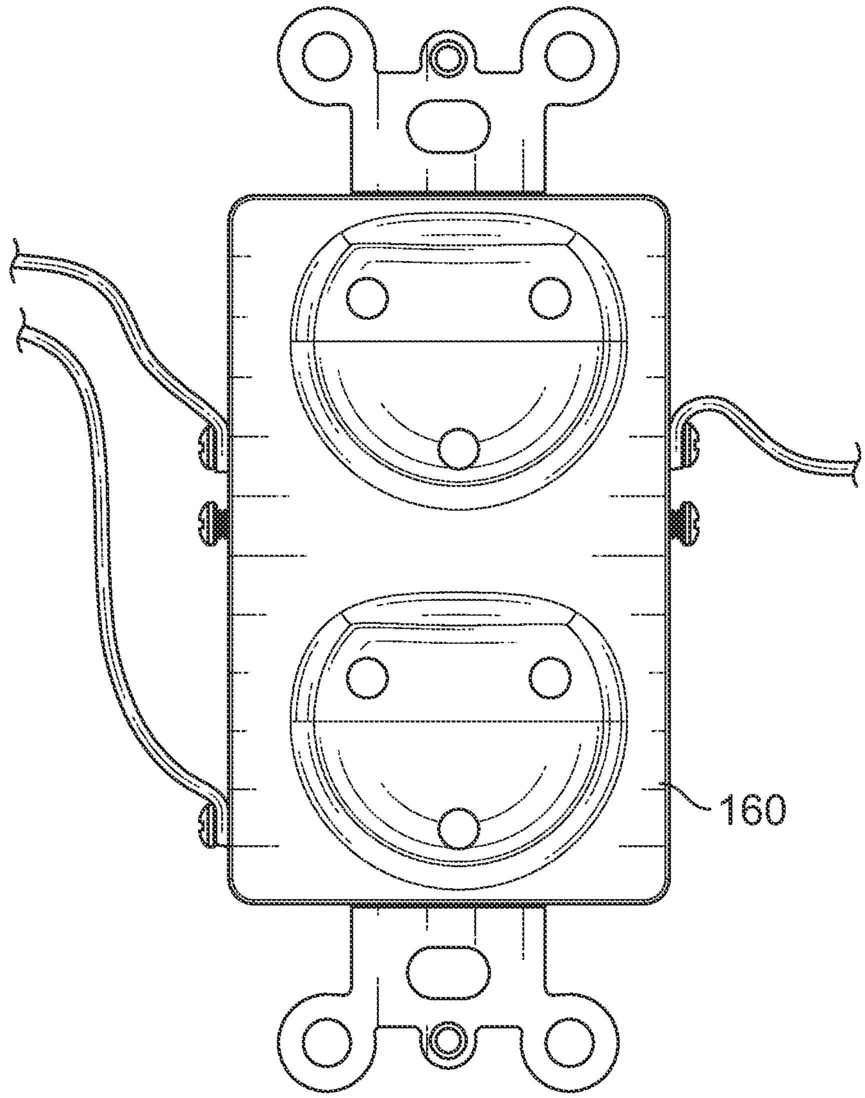
FIG. 14 illustrates an embodiment of an electrical input of the insert of an alternate magnetic charging assembly prior to being embedded into a wall, replacing the standard wall outlet, as shown in FIG. 12.

An alternate version of the magnetic charging assembly is shown in FIGS. 12, 13, and 14. FIG. 12 illustrates an alternate embodiment of the device that embeds itself directly into the wall. In this version, the adapters 120, 140 of the assembly 100 remain unchanged, as does the overall functionality. The insert 160 of this embodiment replaces the standard wall outlet in its entirety instead of needing to plug insert 160 into the wall outlet. The wall insert 160 provides the desired functionality by housing the magnets and pins. A wall cover surrounds the wall insert 160 and contains the insert 160 to the wall and contributes to the overall aesthetic of the device. The modified insert 160 can be best seen in FIG. 13 prior to it being embedded into the wall. The electrical inputs to the insert 16 also stay consistent with that of a common wall outlet and can be seen in FIG. 14.

While preferred materials for elements have been described, the device is not limited by these materials. Wood, plastic, rubber, foam, metal alloys, aluminum, and other materials may comprise some or all of the elements of the device in various embodiments of the present invention.

Although the present invention has been illustrated and described herein with reference to preferred embodiments and specific examples thereof, it will be readily apparent to those of ordinary skill in the art that other embodiments and examples may perform similar function and/or achieve like results. All such equivalent embodiments and examples are within the spirit and scope of the present invention and are contemplated thereby.

The invention claimed is:

1. A magnetic charging assembly comprises:

an adapter including opposing front and back surfaces, wherein electrically-conductive pins extends from the back surface, wherein the front surface includes an outlet configured to receive a plug, and wherein a first set of magnets is provided adjacent to the back surface;

an insert including a front surface, a plurality of pin receiving cavities extending inwardly from the front surface, a second set of magnets is provided adjacent to an inner side of the front surface, and a protruding member extending inwardly from the front surface; and a cover plate positioned adjacent to the inner surface of the insert wherein the cover plate includes a centrally located sleeve that receives the protruding member of the insert, a plurality of openings, and the second set of magnets, wherein the openings of the plurality of openings and the magnets of the second set of magnets are positioned about the centrally located sleeve, wherein each opening is configured to receive an electrically-conductive pin of the adapter;

wherein the cover plate is configured to move between a connected position and a disconnected position;

wherein the first set of magnets and the second set of magnets enable the adapter to attach to the insert; and wherein the set of pins and the pin receiving cavities are electrically conductive such that, when the pins of the adapter are received by the pin receiving cavities of the insert, power is provided through the outlet of the adapter.

2. The magnetic charging assembly of claim 1, wherein the adapter includes a circuit board, and wherein the electrically-conductive pins extend from the circuit board through the back surface.

3. The magnetic charging assembly of claim 2, wherein the first set of magnets is secured to the back surface of the adapter.

4. The magnetic charging assembly of claim 1, wherein the plurality of openings is aligned with the plurality of pin receiving cavities when the cover plate is in the connected position, and wherein the plurality of openings is offset from the plurality of pin receiving cavities when the cover plate is in the disconnected position.

5. The magnetic charging assembly of claim 4, wherein the insert further comprises a spring, wherein the protruding member includes a first groove for receiving a first end of the spring, and wherein the centrally located sleeve of the cover plate includes a second groove for receiving a second end of the spring.

6. The magnetic charging assembly of claim 5, wherein the spring biases the cover plate into the disconnected position.

7. The magnetic charging assembly of claim 6, wherein, when the adapter is positioned adjacent to the insert, the first set of magnets attracts the second set of magnets such that the cover plate rotates about the protruding member into the connected position.

8. The magnetic charging assembly of claim 1, wherein the insert is embedded in a wall.

9. A magnetic charging assembly comprising:

an adapter including opposing front and back surfaces, wherein electrically-conductive pins extend from the back surface, wherein the front surface includes an outlet configured to receive a plug, and wherein a first set of magnets is provided adjacent to the back surface;

an insert including a front surface, a plurality of pin receiving cavities on the front surface, and a protruding member extending inwardly from the inner surface; and a cover plate provided adjacent to an inner surface of the front surface of the insert, the cover plate including a centrally located sleeve that receives the protruding member, wherein the cover plate includes a plurality of openings and a second set of magnets, each opening being configured to receive an electrically-conductive pin of the adapter, and wherein the plurality of openings and the second set of magnets are each positioned equidistantly and alternatingly about the centrally located sleeve;

wherein the first set of magnets and the second set of magnets enable the adapter to attach to the insert; and wherein power is provided through the outlet of the adapter when the electrically-conductive pins are inserted into the pin receiving cavities of the insert.

10. The magnetic charging assembly of claim 9, wherein the cover plate is configured to move between a connected position and a disconnected position.

11. The magnetic charging assembly of claim 10, wherein the plurality of openings is aligned with the plurality of pin receiving cavities when the cover plate is in the connected position, and wherein the plurality of openings is offset from the plurality of pin receiving cavities when the cover plate is in the disconnected position.

12. The magnetic charging assembly of claim 11, wherein the insert further comprises a spring, wherein the protruding member includes a first groove for receiving a first end of the spring, and wherein the centrally located sleeve of the cover plate includes a second groove for receiving a second end of the spring.

13. The magnetic charging assembly of claim 12, wherein the spring biases the cover plate into the disconnected position.

14. The magnetic charging assembly of claim 13, wherein, when the adapter is positioned adjacent to the insert, the first set of magnets attracts the second set of magnets such that the cover plate rotates about the protruding member into the connected position.

15. The magnetic charging assembly of claim 9, wherein the insert is embedded in a wall.

* * * * *